United States Patent
Porras et al.

(10) Patent No.: US 10,495,039 B2
(45) Date of Patent: Dec. 3, 2019

(54) FUEL SYSTEM HAVING A JET PUMP

(71) Applicant: DELPHI TECHNOLOGIES IP LIMITED, St. Michael (BB)

(72) Inventors: Luis M. Porras, Chihuahua (MX); Michael J. McHale, El Paso, TX (US); Alfredo Radillo, Chihuahua (MX); Job Esteban Rios, Chihuahua (MX)

(73) Assignee: DELPHI TECHNOLOGIES IP LIMITED (BB)

(*) Notice: Subject to any disclaimer, the term of this patent is extended or adjusted under 35 U.S.C. 154(b) by 274 days.

(21) Appl. No.: 15/473,905

(22) Filed: Mar. 30, 2017

(65) Prior Publication Data

US 2018/0283331 A1  Oct. 4, 2018

(51) Int. Cl.
| | |
|---|---|
| F02M 37/02 | (2006.01) |
| F02M 37/00 | (2006.01) |
| F02M 37/10 | (2006.01) |
| F04F 5/10 | (2006.01) |
| F04F 5/46 | (2006.01) |
| B60K 15/03 | (2006.01) |
| F04F 5/54 | (2006.01) |

(52) U.S. Cl.
CPC ............ *F02M 37/025* (2013.01); *B60K 15/03* (2013.01); *F02M 37/0094* (2013.01); *F02M 37/106* (2013.01); *F04F 5/10* (2013.01); *F04F 5/468* (2013.01); *F04F 5/54* (2013.01); *B60K 2015/0325* (2013.01)

(58) Field of Classification Search
CPC ............... F02M 37/025; F02M 37/106; F02M 37/0094; F02M 37/0082; F04F 5/466
See application file for complete search history.

(56) References Cited

U.S. PATENT DOCUMENTS

| | | | | |
|---|---|---|---|---|
| 1,002,753 A | * | 9/1911 | Rees ........................ | F04F 5/466 417/179 |
| 4,834,132 A | * | 5/1989 | Sasaki .................... | B60K 15/01 123/514 |
| 5,628,623 A | * | 5/1997 | Skaggs ................... | F04F 5/466 417/151 |
| 6,113,354 A | | 9/2000 | Meese et al. | |

(Continued)

FOREIGN PATENT DOCUMENTS

| | | |
|---|---|---|
| DE | 102014207221 A1 | 10/2015 |
| JP | 63126598 U | 8/1988 |
| JP | 04005126 A | 1/1992 |

*Primary Examiner* — Nathan C Zollinger
(74) *Attorney, Agent, or Firm* — Joshua M. Haines

(57) ABSTRACT

A fuel system includes a fuel pump and a jet pump assembly. The jet pump assembly includes a first fuel passage defined by a first tube. The jet pump assembly also includes a second fuel passage which receives pressurized fuel from the fuel pump, the second fuel passage having a primary orifice centered about and extending along a primary orifice axis such that the primary orifice axis is directed into the first fuel passage and such that the primary orifice introduces a first flow of fuel into the first fuel passage. The second fuel passage also has a secondary orifice centered about and extending along a secondary orifice axis which is not coincident with the primary orifice axis and which is directed at an inner surface of the first tube and the secondary orifice introduces a second flow of fuel into the first fuel passage which impinges the inner surface.

17 Claims, 3 Drawing Sheets

(56) References Cited

U.S. PATENT DOCUMENTS

| | | | | |
|---|---|---|---|---|
| 6,269,800 B1* | 8/2001 | Fischerkeller | ....... | B60K 15/077 |
| | | | | 123/514 |
| 6,296,454 B1* | 10/2001 | Schmid | ................... | F04F 5/463 |
| | | | | 417/151 |
| 6,505,644 B2* | 1/2003 | Coha | ................... | F02M 37/0094 |
| | | | | 123/514 |
| 7,303,378 B2* | 12/2007 | Kleppner | ............. | B60K 15/077 |
| | | | | 417/87 |
| 8,820,350 B2* | 9/2014 | Kim | ................... | F02M 37/0094 |
| | | | | 123/509 |
| 2005/0279414 A1* | 12/2005 | Kleppner | ................ | F04F 5/466 |
| | | | | 137/565.22 |
| 2013/0048119 A1 | 2/2013 | Kim et al. | | |
| 2014/0314591 A1 | 10/2014 | Herrera et al. | | |

* cited by examiner

FUEL SYSTEM HAVING A JET PUMP

TECHNICAL FIELD OF INVENTION

The present invention relates to fuel system, more particularly to a fuel system which includes a jet pump, and still even more particularly to such a jet pump which minimizes the time necessary to prime.

BACKGROUND OF INVENTION

Fuel systems for internal combustion engines typically include a fuel tank for storing a volume of fuel that will be supplied to the internal combustion engine by a fuel pump. When such fuel systems are provided for a motor vehicle, the fuel system also commonly includes a fuel reservoir positioned within the fuel tank. The fuel reservoir provides a volume of fuel which is filled by fuel from the fuel tank. The fuel pump is positioned within the fuel reservoir in order to ensure an adequate supply of fuel is available to the fuel pump when the fuel tank is not full and dynamics of the motor vehicle may cause the fuel within the fuel tank to slosh or migrate to an area of the fuel tank away from the fuel reservoir. In order to maintain a sufficient level of fuel within the fuel reservoir, a jet pump, powered by pressurized fuel from the fuel pump, is used to aspirate fuel from the fuel tank into the fuel reservoir.

U.S. Pat. No. 6,505,644 to Coha et al., the disclosure of which is hereby incorporated by reference in its entirety and referred to hereinafter as Coha et al., describes a fuel system which includes a fuel tank which is partitioned into a primary fuel tank portion and a secondary fuel tank portion. The fuel pump and fuel reservoir are located within the primary fuel tank portion along with a duel barrel jet pump assembly which is provided to refill the fuel reservoir from both the primary fuel tank portion and the secondary fuel tank portion. A first barrel of the dual barrel jet pump assembly aspirates fuel from the primary fuel tank portion while a second barrel of the duel barrel jet pump assembly aspirates fuel from the secondary fuel tank portion via a transfer tube. Due to the length of the transfer tube, the time needed to prime the transfer tube may take sufficiently long that certain conditions may exist that the fuel pump may empty the fuel reservoir before the transfer tube can be primed. By way of non-limiting example only, this situation may occur when the fuel level within the fuel tank is low and the internal combustion engine supplied by the fuel pump is operated in a high fuel consumption manner and the motor vehicle is operated in a highly dynamic manner as may be experienced in a racing environment.

U.S. Pat. No. 6,113,354 to Meese et al., referred to hereinafter as Meese et al., discloses a fuel system with a fuel tank similar to that of Coha et al. Unlike Coha et al., Meese et al. does not include a fuel reservoir, and consequently is only concerned with transferring fuel from the secondary fuel tank portion to the primary fuel tank portion. In order to accomplish this, Meese et al. provides a jet pump within the secondary fuel tank portion which is operated by pressurized fuel from the fuel pump. Since the jet pump is located within the secondary fuel tank portion, the priming time is reduced compared to that of Meese et al. However, this reduced time in priming comes at the expense of added cost and complexity of delivering high pressure fuel to the secondary fuel tank portion. While not disclosed by Meese et al., it is known in the art to provide a jet pump within the secondary fuel tank portion to refill a fuel reservoir within the primary fuel tank portion.

What is needed is a fuel supply system which minimizes or eliminates one or more of the shortcomings as set forth above.

SUMMARY OF THE INVENTION

Briefly described, a fuel system for supplying fuel to a fuel consuming device includes a fuel pump having a fuel pump inlet and a fuel pump outlet such that the fuel pump pumps fuel from the fuel pump inlet to the fuel pump outlet. The fuel system also includes a jet pump assembly which includes a first fuel passage defined by a first tube, the first fuel passage having a first fuel passage inlet and a first fuel passage outlet. The jet pump assembly also includes a second fuel passage defined by a second tube and connected to the fuel pump outlet such that the second fuel passage receives pressurized fuel from the fuel pump outlet, the second fuel passage having a primary orifice which extends through the second tube, the primary orifice being centered about and extending along a primary orifice axis such that the primary orifice axis is directed into the first fuel passage and the primary orifice introduces a first flow of fuel into the first fuel passage, the second fuel passage also having a secondary orifice which extends through the second tube, the secondary orifice being centered about and extending along a secondary orifice axis which is not coincident with the primary orifice axis and which is directed at an inner surface of the first tube. The secondary orifice introduces a second flow of fuel into the first fuel passage which impinges an inner surface of the first tube such that the first flow of fuel and the second flow of fuel create a venturi effect within the first fuel passage which draws a third flow of fuel into the first fuel passage through the first fuel passage inlet such that the first flow of fuel, the second flow of fuel, and the third flow of fuel combine in the first fuel passage and exit the first fuel passage through the first fuel passage outlet. The secondary orifice results in a significant reduction in the priming time; i.e. the time taken to bring fuel to the first fuel passage inlet so that it can be drawn into the first fuel passage through the first fuel passage inlet.

A jet pump assembly may be provided which includes a first fuel passage defined by a first tube, the first fuel passage having a first fuel passage inlet and a first fuel passage outlet. The jet pump assembly also includes a second fuel passage defined by a second tube and configured to be connected to receive pressurized fuel from a fuel pump outlet of a fuel pump, the second fuel passage having a primary orifice which extends through the second tube, the primary orifice being centered about and extending along a primary orifice axis such that the primary orifice axis is directed into the first fuel passage and the primary orifice introduces a first flow of fuel into the first fuel passage, the second fuel passage also having a secondary orifice which extends through the second tube, the secondary orifice being centered about and extending along a secondary orifice axis which is not coincident with the primary orifice axis and which is directed at an inner surface of the first tube such that the secondary orifice introduces a second flow of fuel into the first fuel passage which impinges the inner surface of the first tube, the first flow of fuel and the second flow of fuel creating a venturi effect within the first fuel passage which draws a third flow of fuel into the first fuel passage through the first fuel passage inlet such that the first flow of fuel, the second flow of fuel, and the third flow of fuel combine in the first fuel passage and exit the first fuel passage through the first fuel passage outlet.

BRIEF DESCRIPTION OF DRAWINGS

This invention will be further described with reference to the accompanying drawings in which.

DETAILED DESCRIPTION OF INVENTION

Figure 1:
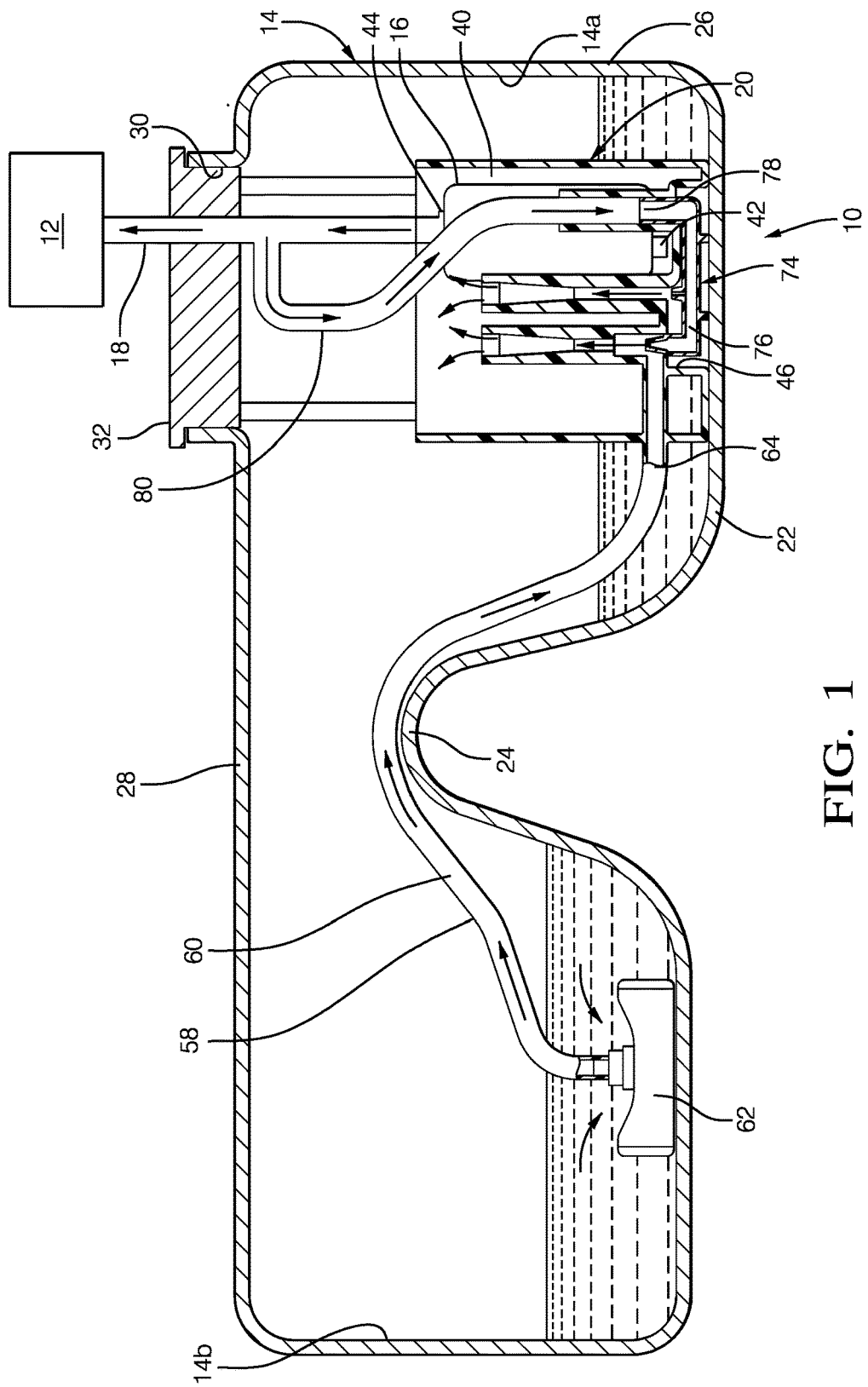
FIG. 1 a schematic cross-sectional view of a fuel system in accordance with the present invention for supplying fuel to an internal combustion engine.
Figure 2:
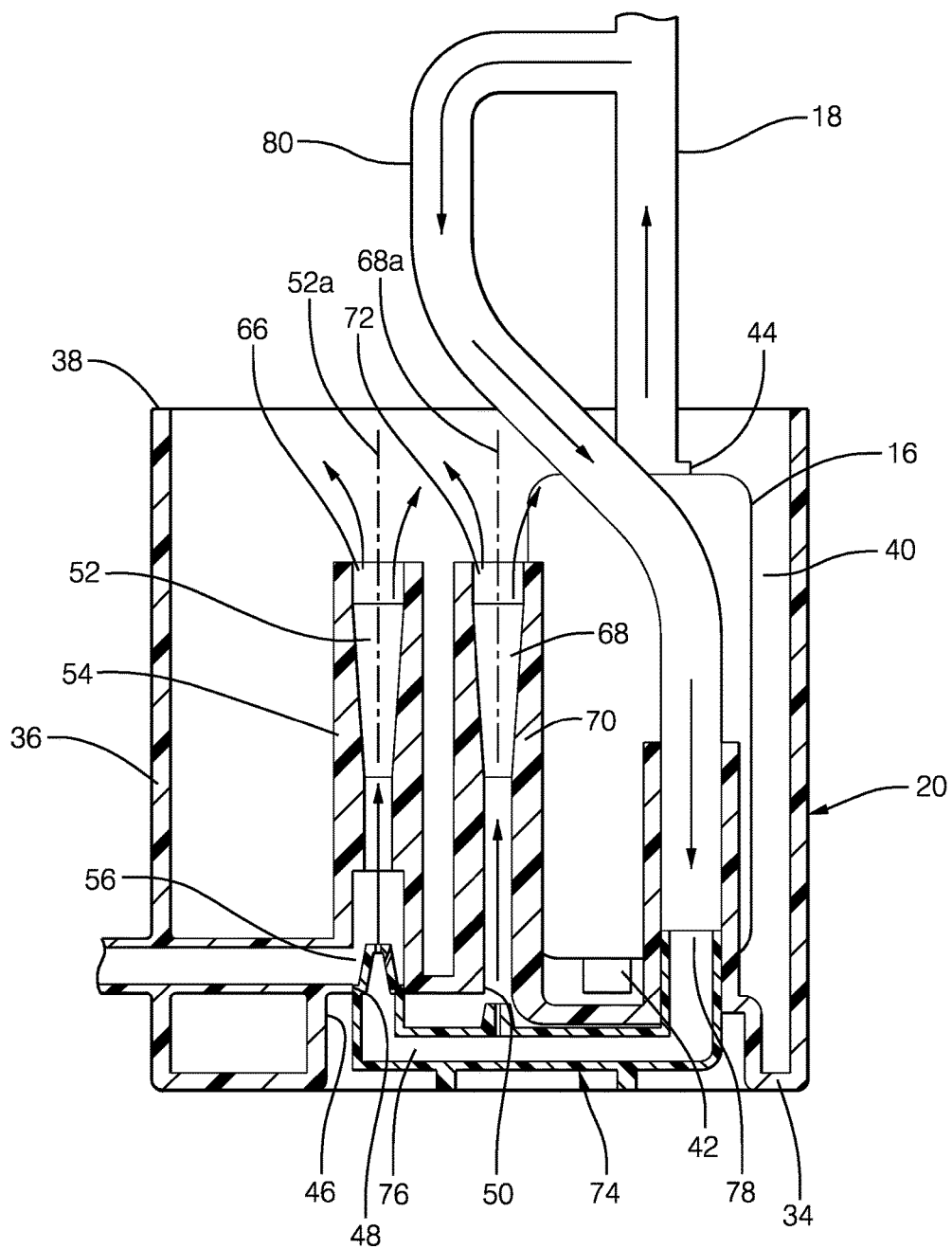
FIG. 2 is a cross-sectional view of a fuel reservoir and jet pump of the fuel system of FIG. 1.
Figure 3:
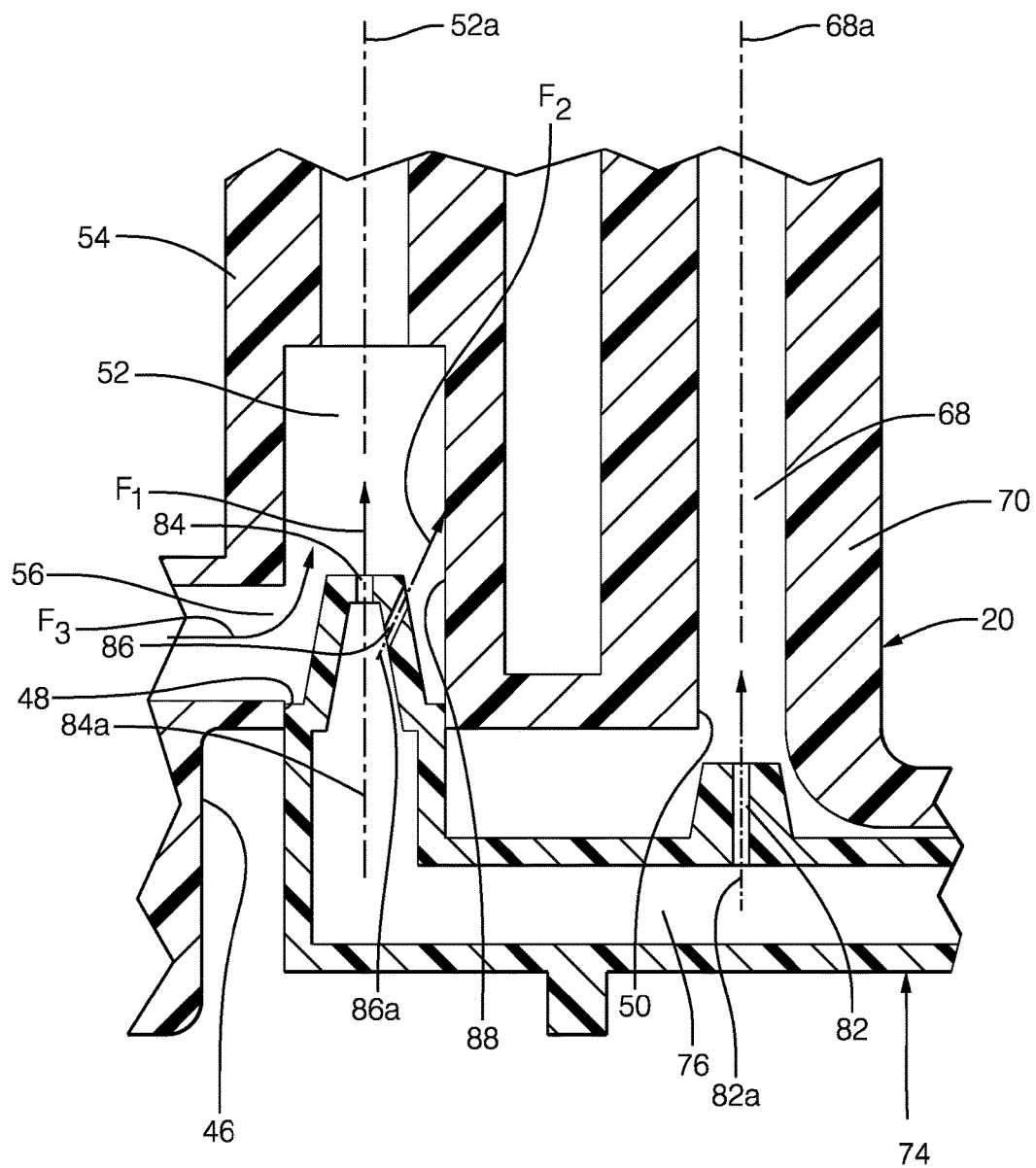
FIG. 3 is an enlarged portion of FIG. 2.

Referring to the drawings, a fuel system 10 is shown in accordance with the invention for supplying fuel to a fuel consuming device, illustrated by way of non-limiting example only, as an internal combustion engine 12. The fuel of fuel system 10 may be any liquid fuel customarily used, for example only, gasoline, diesel fuel, alcohol, ethanol, and the like, and blends thereof.

Fuel system 10 includes a fuel tank 14 for storing a quantity of fuel and a fuel pump 16 for pumping fuel from fuel tank 14 to internal combustion engine 12. Fuel that is pumped by fuel pump 16 is communicated to internal combustion engine 12 through a fuel supply line 18. Fuel pump 16 is an electric fuel pump which receives electricity from an electricity source (not shown), and may be, by way of non-limiting example only, a fuel pump as disclosed in United States Patent Application Publication No. US 2014/0314591 A1, the entire disclosure of which is incorporated herein by reference in its entirety. Fuel pump 16 is disposed within a fuel reservoir 20 which is a separate container within fuel tank 14 that is filled with fuel from fuel tank 14. When the fuel level in fuel tank 14 is sufficiently high, fuel reservoir 20 is filled by fuel simply spilling over the top of fuel reservoir 20. However, when the fuel level in fuel tank 14 is not sufficiently high to spill over the top of fuel reservoir 20, fuel reservoir 20 is filled by fuel pump 16 as will be described in greater detail later.

Fuel tank 14 will now be described in greater detail. Fuel tank 14 has a fuel tank bottom wall 22 which defines a partition 24 extending upward near the center thereof which divides fuel tank 14 into a primary fuel tank portion 14a and a secondary fuel tank portion 14b such that fuel pump 16 and fuel reservoir 20 are located within primary fuel tank portion 14a. Fuel tank 14 also includes a fuel tank sidewall 26 around the periphery of fuel tank bottom wall 22 which extends generally perpendicular upward from fuel tank bottom wall 22. Fuel tank 14 also includes fuel tank top wall 28 which extends from fuel tank sidewall 26 in a generally perpendicular direction such that fuel tank top wall 28 opposes fuel tank bottom wall 22. Fuel tank top wall 28 includes a fuel tank opening 30 therethrough which accommodates insertion of fuel pump 16 and fuel reservoir 20 thereinto such that fuel tank opening 30 is closed by a fuel tank cover 32. Fuel tank 14 is made of a rigid material as is well known to those of skill in the art of fuel tanks, and may be, by way of non-limiting example only, a plastic material manufactured by a blow molding process.

Fuel reservoir 20 will now be described in greater detail. Fuel reservoir 20 includes a fuel reservoir bottom wall 34 and a fuel reservoir sidewall 36 which is generally annular in shape such that fuel reservoir sidewall 36 extends from fuel reservoir bottom wall 34 in a generally perpendicular direction from fuel reservoir bottom wall 34 to a top end 38 thereof which is open and which defines an overflow level of fuel reservoir 20. In this way, fuel reservoir 20 is bucket-shaped and defines a fuel reservoir volume 40 therewithin such that fuel pump 16 is disposed is disposed within fuel reservoir volume 40. Fuel is drawn into fuel pump 16 through a fuel pump inlet 42 of fuel pump 16 from fuel reservoir volume 40 and pumps the fuel to fuel supply line 18 through a fuel pump outlet 44 of fuel pump 16. Fuel reservoir bottom wall 34 includes a fuel reservoir recess 46 which faces toward fuel tank bottom wall 22 such that a first opening 48 passes through fuel reservoir bottom wall 34 into fuel reservoir recess 46 and such that a second opening 50 passes through fuel reservoir bottom wall 34 into fuel reservoir recess 46.

A first fuel reservoir refill passage 52 defined by a first fuel reservoir refill tube 54 is located within fuel reservoir volume 40 such that first opening 48 opens into first fuel reservoir refill passage 52 and such that first fuel reservoir refill passage 52 is centered about and extends along a first fuel reservoir refill passage axis 52a. As shown, first fuel reservoir refill tube 54 may be molded as a single piece of plastic with fuel reservoir 20, but may alternatively be formed separately and subsequently fixed to fuel reservoir 20. First fuel reservoir refill passage 52 includes a first fuel reservoir refill passage inlet 56. A transfer tube 58 defines a transfer fuel passage 60 having a transfer fuel passage inlet 62, depicted in FIG. 1 as a strainer, located within secondary fuel tank portion 14b and also having a transfer fuel passage outlet 64 which is connected to first fuel reservoir refill passage inlet 56. First fuel reservoir refill passage 52 includes a first fuel reservoir refill passage outlet 66 which opens into fuel reservoir volume 40. First fuel reservoir refill passage 52 is used to refill fuel reservoir volume 40 with fuel from secondary fuel tank portion 14b as will be described in greater detail later.

A second fuel reservoir refill passage 68 defined by a second fuel reservoir refill tube 70 is located within fuel reservoir volume 40 such that second opening 50 opens into second fuel reservoir refill passage 68 and such that second fuel reservoir refill passage 68 is centered about and extends along a second fuel reservoir refill passage axis 68a. As shown, second fuel reservoir refill tube 70 may be molded as a single piece of plastic with fuel reservoir 20, but may alternatively be formed separately and subsequently fixed to fuel reservoir 20. Second fuel reservoir refill passage 68 is open to fuel reservoir recess 46 through second opening 50, and in this way, second opening 50 serves as an inlet to second fuel reservoir refill passage 68. Second fuel reservoir refill passage 68 includes a second fuel reservoir refill passage outlet 72 which opens into fuel reservoir volume 40. Second fuel reservoir refill passage 68 is used to refill fuel reservoir volume 40 with fuel from primary fuel tank portion 14a as will be described in greater detail later.

In order to refill fuel reservoir volume 40 with fuel from primary fuel tank portion 14a and secondary fuel tank portion 14b, a jet pump 74 is provided which is a tube defining a jet pump fuel passage 76. Jet pump 74 includes a jet pump inlet 78 which is connected to fuel pump outlet 44 such that jet pump fuel passage 76 receives pressurized fuel from fuel pump outlet 44 through a jet pump supply line 80. As shown, jet pump supply line 80 branches off from fuel supply line 18, but may alternatively receive fuel from fuel pump 16 through a dedicated outlet or may receive fuel from fuel pump 16 through a fuel return line from internal combustion engine 12 which communicates unused fuel back to fuel tank 14. Jet pump 74, together with first fuel reservoir refill passage 52 and second fuel reservoir refill passage 68, define a jet pump assembly. While jet pump 74 has been illustrated herein as being formed as a separate component from first fuel reservoir refill passage 52 and second fuel reservoir refill passage 68, it should now be understood that jet pump 74 may alternatively be integrally formed as a single piece with one or more of first fuel reservoir refill passage 52 and second fuel reservoir refill passage 68 such that jet pump 74 is still identifiable as a tube distinct from the tubes which form first fuel reservoir refill passage 52 and second fuel reservoir refill passage 68.

Jet pump 74 includes a jet pump primary fuel tank portion orifice 82 which extends therethrough, i.e. through the wall of jet pump 74, to define an outlet of jet pump fuel passage 76. Jet pump primary fuel tank portion orifice 82 is centered about and extends along a jet pump primary fuel tank portion orifice axis 82a such that jet pump primary fuel tank portion orifice axis 82a is coincident with second fuel reservoir refill passage axis 68a. Jet pump primary fuel tank portion orifice 82 is directed into second fuel reservoir refill passage 68, and consequently, fuel that exits jet pump 74 through jet pump primary fuel tank portion orifice 82 creates a venturi effect within second fuel reservoir refill passage 68 which draws fuel into second fuel reservoir refill passage 68 through second opening 50. The fuel drawn into second fuel reservoir refill passage 68 through second opening 50 combines with the fuel directed into second fuel reservoir refill passage 68 from jet pump primary fuel tank portion orifice 82 and exits second fuel reservoir refill passage 68 through second fuel reservoir refill passage outlet 72 to refill fuel reservoir volume 40.

A portion of jet pump 74 extends into first opening 48 of fuel reservoir bottom wall 34 and includes a jet pump secondary fuel tank portion primary orifice 84 which extends therethrough, i.e. through the wall of the jet pump 74, to define another outlet. The portion of jet pump 74 which extends into first opening 48 fits tightly with first opening 48 so as to prevent fuel from passing between the interface of first opening 48 and jet pump 74. Jet pump secondary fuel tank portion primary orifice 84 is centered about and extends along a jet pump secondary fuel tank portion primary orifice axis 84a such that jet pump secondary fuel tank portion primary orifice axis 84a extends in the same direction as first fuel reservoir refill passage axis 52a, and preferably is coincident with first fuel reservoir refill passage axis 52a, i.e. first fuel reservoir refill passage 52 and jet pump secondary fuel tank portion primary orifice 84 share the same axis. Jet pump secondary fuel tank portion primary orifice axis 84a, and consequently jet pump secondary fuel tank portion primary orifice 84, is directed into first fuel reservoir refill passage 52 to introduce a first fuel flow $F_1$ into first fuel reservoir refill passage 52. The portion of jet pump 74 which extends into first opening 48 also includes a jet pump secondary fuel tank portion secondary orifice 86 which extends therethrough, i.e. through the wall of the jet pump 74, to define another outlet. Jet pump secondary fuel tank portion secondary orifice 86 is centered about and extends along a jet pump secondary fuel tank portion secondary orifice axis 86a such that jet pump secondary fuel tank portion secondary orifice axis 86a is not coincident with jet pump secondary fuel tank portion primary orifice axis 84a, i.e. jet pump secondary fuel tank portion primary orifice 84 and jet pump secondary fuel tank portion secondary orifice 86 do not share the same axis. As shown, jet pump secondary fuel tank portion secondary orifice axis 86a is preferably not parallel to jet pump secondary fuel tank portion primary orifice axis 84a. Jet pump secondary fuel tank portion secondary orifice axis 86a is directed into first fuel reservoir refill passage 52 and is directed at an inner surface 88 of first fuel reservoir refill tube 54 to introduce a second flow of fuel $F_2$ into first fuel reservoir refill passage 52 which impinges on inner surface 88 of first fuel reservoir refill tube 54. First flow of fuel $F_1$ and second flow of fuel $F_2$ create a venturi effect within first fuel reservoir refill passage 52 which draws a third flow of fuel $F_3$ into first fuel reservoir refill passage 52 through first fuel reservoir refill passage inlet 56 from secondary fuel tank portion 14b via transfer tube 58. Third flow of fuel $F_3$ combines with first flow of fuel $F_1$ and second flow of fuel $F_2$ within first fuel reservoir refill passage 52 and exits first fuel reservoir refill passage 52 through first fuel reservoir refill passage outlet 66 to refill fuel reservoir volume 40.

Without being bound by any particular theory, the Inventors believe that by jet pump secondary fuel tank portion secondary orifice 86 directing second flow of fuel $F_2$ to impinge on inner surface 88 of first fuel reservoir refill tube 54, turbulence is induced within first fuel reservoir refill passage 52 which breaks up the fuel up into fine particles which helps to displace air within first fuel reservoir refill passage 52. Consequently, the time needed to prime transfer tube 58 is reduced significantly. In other words, when transfer tube 58 is initially free of fuel, jet pump secondary fuel tank portion secondary orifice 86 reduces the time it takes draw fuel through transfer tube 58 from secondary fuel tank portion 14b and begin to refill fuel reservoir volume 40 through first fuel reservoir refill passage 52. Furthermore, the solution provided by the present invention avoids the added cost and complexity associated with providing a jet pump in the secondary fuel tank portion in order to reduce the priming time.

In one example, jet pump 74 was provided with jet pump secondary fuel tank portion primary orifice 84 having a diameter of 0.6 mm and also provided with jet pump secondary fuel tank portion secondary orifice 86 having a diameter of 0.35 mm. Fuel pump 16 was operated to provide fuel to jet pump 74 at a pressure of 400 KPa and the time taken to prime transfer tube 58 was measured to be 3 seconds. In comparison, a jet pump having the same features as just described was provided, except that jet pump secondary fuel tank portion secondary orifice 86 was omitted. When fuel pump 16 was operated to provide fuel to the jet pump of this configuration, i.e. jet pump secondary fuel tank portion secondary orifice 86 omitted, at a pressure of 400 KPa, a time of 9 seconds was measured to prime transfer tube 58. Furthermore, it was observed that merely increasing the size of jet pump secondary fuel tank portion primary orifice 84, without providing jet pump secondary fuel tank portion secondary orifice 86, did not provide the decreased time to prime transfer tube 58 that was realized in jet pump 74 which includes both jet pump secondary fuel tank portion primary orifice 84 and jet pump secondary fuel tank portion secondary orifice 86.

While jet pump secondary fuel tank portion secondary orifice 86 has been described and illustrated herein as being used to improve the time needed to prime transfer tube 58 which transfers fuel from secondary fuel tank portion 14b to primary fuel tank portion 14a, it should now be understood that jet pump secondary fuel tank portion secondary orifice 86 may also be provided to complement jet pump primary fuel tank portion orifice 82 in order to improve the time needed begin filling fuel reservoir volume 40 from primary fuel tank portion 14a. Consequently, jet pump secondary fuel tank portion secondary orifice 86 may be useful in fuel systems where the fuel tank does not include partition 24 which divides fuel tank 14 into primary fuel tank portion 14a and secondary fuel tank portion 14b.

While jet pump 74 has been illustrated as being used to transfer fuel from secondary fuel tank portion 14b to fuel reservoir volume 40, it should now be understood that jet pump 74 may alternatively be used to transfer fuel from secondary fuel tank portion 14b to fuel from primary fuel tank portion 14a outside of fuel reservoir volume 40. Furthermore, jet pump 74 may be two distinct jet pumps, namely one jet pump which transfers fuel from secondary fuel tank portion 14b or fuel reservoir volume 40 and another jet pump which refills fuel reservoir volume 40 from primary fuel tank portion 14a.

While the present invention has been embodied herein as including a single jet pump secondary fuel tank portion secondary orifice 86, it should now be understood that additional jet pump secondary fuel tank portion secondary orifices may be included where the axis of each jet pump secondary fuel tank portion secondary orifice 86 is directed at inner surface 88 of first fuel reservoir refill tube 54.

While this invention has been described in terms of preferred embodiments thereof, it is not intended to be so limited, but rather only to the extent set forth in the claims that follow.

We claim:

1. A fuel system for supplying fuel to a fuel consuming device, said fuel system comprising:
    a fuel pump having a fuel pump inlet and a fuel pump outlet such that said fuel pump pumps fuel from said fuel pump inlet to said fuel pump outlet; and
    a jet pump assembly comprising:
        a first fuel passage defined by a first tube, said first fuel passage having a first fuel passage inlet and a first fuel passage outlet; and
        a second fuel passage defined by a second tube and connected to said fuel pump outlet such that said second fuel passage receives pressurized fuel from said fuel pump outlet, said second fuel passage having a primary orifice which extends through said second tube, said primary orifice being centered about and extending along a primary orifice axis such that said primary orifice axis is directed into said first fuel passage and said primary orifice introduces a first flow of fuel into said first fuel passage, said second fuel passage also having a secondary orifice which extends through said second tube, said secondary orifice being centered about and extending along a secondary orifice axis which is not coincident with said primary orifice axis and which is directed at an inner surface of said first tube such that said secondary orifice introduces a second flow of fuel into said first fuel passage which impinges said inner surface of said first tube, said first flow of fuel and said second flow of fuel creating a venturi effect within said first fuel passage which draws a third flow of fuel into said first fuel passage through said first fuel passage inlet such that said first flow of fuel, said second flow of fuel, and said third flow of fuel combine in said first fuel passage and exit said first fuel passage through said first fuel passage outlet;
        wherein said secondary orifice axis is not parallel to said primary orifice axis and continuously diverges away from said primary orifice axis in a direction from said primary orifice to said first fuel passage outlet.

2. A fuel system as in claim 1, wherein said first fuel passage is centered about said primary orifice axis and extends along said primary orifice axis.

3. A fuel system as in claim 1, wherein said first fuel passage is centered about and extends along a first fuel passage axis which extends in the same direction as said primary orifice axis.

4. A fuel system as in claim 1 further comprising:
    a fuel tank having a partition which divides said fuel tank into a primary fuel tank portion and a secondary fuel tank portion such that said fuel pump is located within said primary fuel tank portion; and
    a third fuel passage defined by a third tube, said third fuel passage having a third fuel passage inlet located within said secondary fuel tank portion and a third fuel passage outlet connected to said first fuel passage inlet such that said first flow of fuel and said second flow of fuel draws said third flow of fuel from said secondary fuel tank portion into said primary fuel tank portion.

5. A fuel system as in claim 4 further comprising a fuel reservoir within said primary fuel tank portion defining a fuel reservoir volume such that said fuel pump is located within said fuel reservoir volume, wherein said first fuel passage outlet discharges fuel into said fuel reservoir volume.

6. A fuel system as in claim 1 further comprising:
    a fuel tank; and
    a fuel reservoir within said fuel tank defining a fuel reservoir volume such that said fuel pump is located within said fuel reservoir volume;
    wherein said first fuel passage outlet discharges fuel into said fuel reservoir volume.

7. A fuel system as in claim 1, wherein said primary orifice and said secondary orifice are each located within said first fuel passage such that said primary orifice is closer to said first fuel passage outlet than said secondary orifice is located to first said fuel passage outlet.

8. A fuel system as in claim 1, wherein said first fuel passage inlet is radially aligned with said second tube.

9. A fuel system as in claim 1, wherein said secondary orifice is sized to be smaller in diameter than said primary orifice.

10. A fuel system as in claim 2, wherein said secondary orifice is sized to be smaller in diameter than said primary orifice.

11. A jet pump assembly comprising:
    a first fuel passage defined by a first tube, said first fuel passage having a first fuel passage inlet and a first fuel passage outlet; and
    a second fuel passage defined by a second tube and configured to be connected to receive pressurized fuel from a fuel pump outlet of a fuel pump, said second fuel passage having a primary orifice which extends through said second tube, said primary orifice being centered about and extending along a primary orifice axis such that said primary orifice axis is directed into said first fuel passage and said primary orifice introduces a first flow of fuel into said first fuel passage, said second fuel passage also having a secondary orifice which extends through said second tube, said secondary orifice being centered about and extending along a secondary orifice axis which is not coincident with said primary orifice axis and which is directed at an inner surface of said first tube such that said secondary orifice introduces a second flow of fuel into said first fuel passage which impinges said inner surface of said first tube, said first flow of fuel and said second flow of fuel creating a venturi effect within said first fuel passage which draws a third flow of fuel into said first fuel passage through said first fuel passage inlet such that said first flow of fuel, said second flow of fuel, and said third flow of fuel combine in said first fuel passage and exit said first fuel passage through said first fuel passage outlet wherein said secondary orifice axis is not parallel to said primary orifice axis and continuously diverges away from said primary orifice axis in a direction from said primary orifice to said first fuel passage outlet.

12. A jet pump assembly as in claim 11, wherein said first fuel passage is centered about said primary orifice axis and extends along said primary orifice axis.

13. A jet pump assembly as in claim 11, wherein said first fuel passage is centered about and extends along a first fuel passage axis which extends in the same direction as said primary orifice axis.

14. A jet pump assembly as in claim 11, wherein said primary orifice and said secondary orifice are each located within said first fuel passage such that said primary orifice is closer to said first fuel passage outlet than said secondary orifice is located to said first fuel passage outlet.

15. A jet pump assembly as in claim 11, wherein said first fuel passage inlet is radially aligned with said second tube.

16. A jet pump assembly as in claim 11, wherein said secondary orifice is sized to be smaller in diameter than said primary orifice.

17. A jet pump assembly as in claim 12, wherein said secondary orifice is sized to be smaller in diameter than said primary orifice.

* * * * *